United States Patent [19]
Fuchs, Jr.

[11] Patent Number: 4,751,058

[45] Date of Patent: Jun. 14, 1988

[54] TEMPERATURE COMPENSATED PRESSURE VESSEL

[76] Inventor: Francis J. Fuchs, Jr., P.O. Box 10016, Naples, Fla. 33941

[21] Appl. No.: 696,029

[22] Filed: Jan. 28, 1985

[51] Int. Cl.⁴ .............................................. B29C 3/00
[52] U.S. Cl. .................................... 422/240; 422/241; 220/3
[58] Field of Search ....................... 422/240, 241, 242; 425/77, 406; 220/3

[56] References Cited

U.S. PATENT DOCUMENTS

| | | | |
|---|---|---|---|
| 1,440,109 | 12/1922 | Schenck | 422/241 |
| 3,719,519 | 3/1973 | Perugini | 422/241 |

OTHER PUBLICATIONS

"Directory of Construction Materials", Chemical Engineering, McGraw-Hill, Nov. 1956, pp. 197-201.

Primary Examiner—Barry S. Richman
Assistant Examiner—Biuy Ray Johnson
Attorney, Agent, or Firm—R. Gale Rhodes, Jr.

[57] ABSTRACT

An improved pressure vessel which maintains the press-fit between the concentric rings of different material at all temperatures up to the maximum operating temperature by providing an intermediate ring between the inner ring having a coefficient of expansion less than the coefficient of the outer ring wherein the intermediate ring has a coefficient of expansion greater than the outer ring, the radial thickness of the intermediate ring is determined in terms of the radial thicknesses and coefficients of expansion of the inner and outer rings such that upon the pressure vessel operating to the maximum temperature the combined expansions or increases in radial thicknesses of the inner and intermediate rings are equal, or substantially equal to, the expansion or increase in radial thickness of the outer ring.

4 Claims, 3 Drawing Sheets

NON-TEMPERATURE COMPENSATED
PRESSURE VESSEL

TEMPERATURE COMPENSATED
PRESSURE VESSEL

TEMPERATURE COMPENSATED
PRESSURE VESSEL

TEMPERATURE COMPENSATED PRESSURE VESSEL

BACKGROUND OF THE INVENTION

This invention relates generally to pressure vessels and in particular to a new and improved temperature compensated pressure vessel comprised of a plurality of press-fitted concentric rings.

Referring generally to FIGS. 1 and 2, it will be understood that such FIGS., respectively, illustrate diagrammatically a prior art non-temperature compensated pressure vessel 10 and a temperature compensated pressure vessel 20 embodying the present invention. The drawings are in the nature of cross-sectional drawings, but the cross-section lines have been omitted for clarity of presentation. The structures shown are of generally annular or cylindrical configuration and as known to those skilled in the art, such annular or cylindrical structures are referred to as rings; the respective pressure vessel closure apparatus, hydraulic rams, etc. have also been omitted for clarity of presentation. As is further known to those skilled in the art, the interfaces of the rings are provided with suitable interference tapers and the rings are press-fitted together.

The pressure vessels 10 and 20 provide, respectively, central bores or chambers 12 and 22 for receiving pressurized fluid for performing a work function, such as for example the hydrostatic extrusion of metal rod into wire; the pressure vessels, as understood by those skilled in the art, are for containing the pressurized fluid during the work function. Each FIG. is a split view, the left half of each FIG. shows the positions of the respective pressure vessel rings when cold and the right half when hot.

The non-temperature compensated pressure vessel 10 of FIG. 1, as known to those skilled in the art, typically includes a steel inner liner 14, a tungsten carbide support ring 15, a steel support ring 16 radially interrupted to interrupt hoop stress, and an outer steel support ring 17; the steel may be, for example, M-2 high compression strength steel. As is further known to those skilled in the art, Young's modulus of tungsten carbide is approximately three times that of steel; tungsten carbide is strong in compression and weak in tension, whereas steel is relatively strong in tension. Thus, as also known to those skilled in the art, the different ring materials are chosen to take advantage of their relative strengths and to minimize their relative weaknesses. Upon assembly, as also known to those skilled in the art, the annular pressure vessel structures of FIG. 1 are provided with suitable relative interference fits and are thereafter suitably press-fitted together particularly to prestress the tungsten carbide radially inwardly placing it in compression to a level such that, during the performance of the above-noted work function of the pressure vessel, the tungsten carbide support ring preferably never goes into tension but remains in compression due to the interference fit with the outer steel support ring 16 and the radially inward support stress provided thereby.

As is further known to those skilled in the art, the coefficient of expansion $C.E._{TC}$ of tungsten carbide is less than that of steel $C.E._S$:

$$C.E._{TC} < C.E._S \qquad (1)$$

Accordingly, upon performance of the work function, the pressure vessel becomes hot and it has been discovered that due to the differences in coefficient of expansion between the tungsten carbide and steel, the steel support ring 16 will expand radially outwardly away from the tungsten carbide ring 15 decreasing the contact stress therebetween sufficiently to cause a loss in the radially inward support stress provided by the outer steel support ring 16 to the inner tungsten carbide ring 15 whereupon the tungsten carbide ring 15 can go into tension sufficiently great to cause it to fracture and ruin the pressure vessel. This phenomenon is illustrated diagrammatically in FIG. 1 by the annular gap or space 19 shown between the tungsten carbide support ring 15 and the interrupted steel support ring 16.

SUMMARY OF THE INVENTION

The present invention maintains the press-fit between the concentric rings of different material of a pressure vessel at all temperatures up to the maximum operating temperature by providing an intermediate ring between the inner ring having a coefficient of expansion less than the coefficient of the outer ring wherein the intermediate ring has a coefficient of expansion greater than the outer ring, the radial thickness of the intermediate ring is determined in terms of the radial thicknesses and coefficients of expansion of the inner and outer rings such that upon the pressure vessel operating to the maximum temperature the combined expansions or increases in radial thicknesses of the inner and intermediate rings are equal, or substantially equal to, the expansion or increase in radial thickness of the outer ring.

DESCRIPTION OF THE PREFERRED EMBODIMENT

Figure 1:
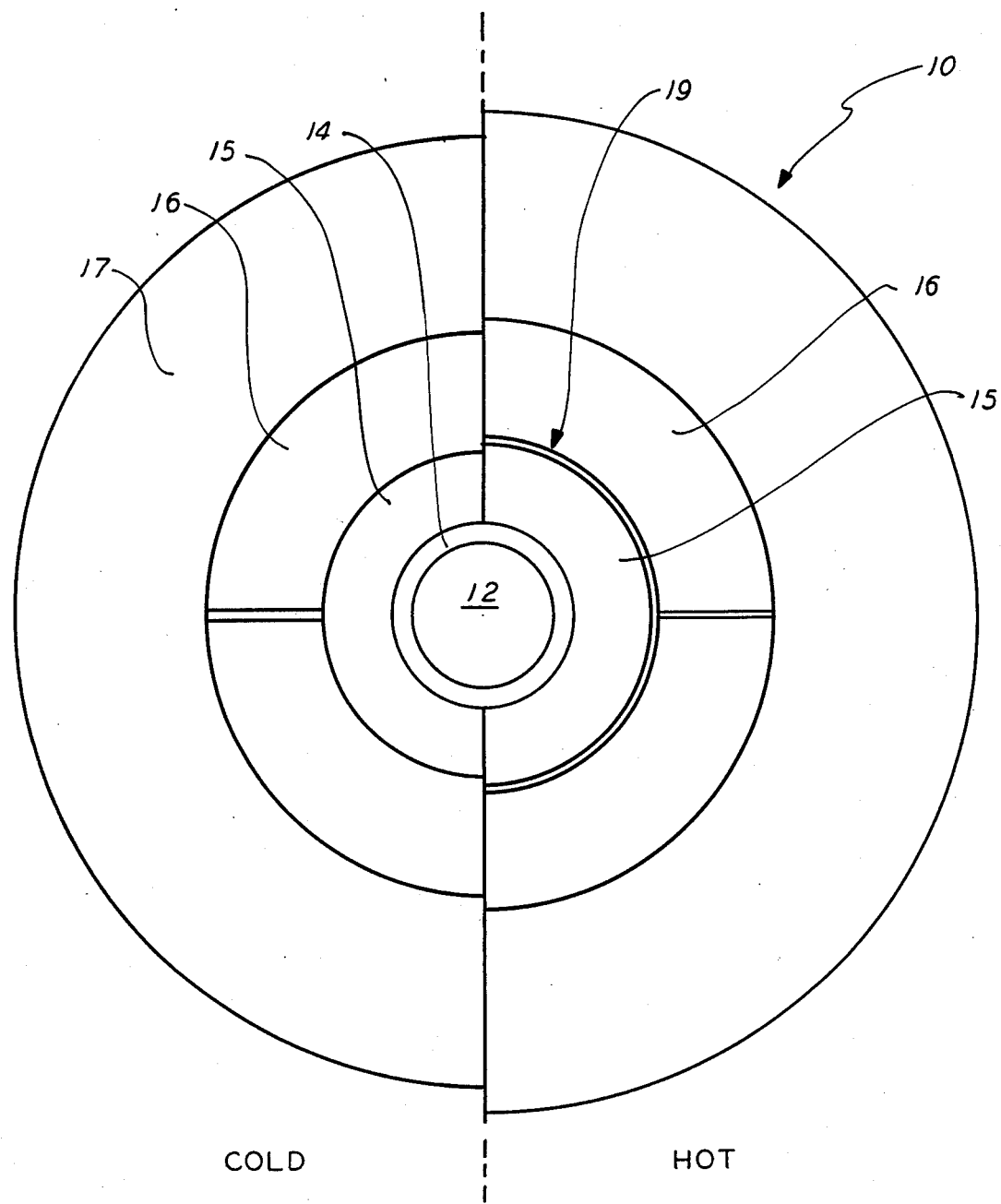
FIG. 1 is a diagrammatical, cross-sectional split view illustration of a prior art non-temperature compensated pressure vessel, the left portion of the FIG. shows the relative positions of the pressure vessel structural members when cold and the right portion when hot.

It has been discovered, and in accordance with the teachings of the present invention, that if the radially interrupted support ring 16 (FIG. 1) is replaced by an intermediate ring of material having a coefficient of expansion and radial thickness such that upon the pressure vessel operating at its maximum operating temperature the combined expansions or increases in radial thicknesses of the tungsten carbide ring 14 and the intermediate ring due to their respective coefficients of expansion at the maximum temperature equal, or substantially equal, the expansion or increase in radial thickness of the outer support ring 17 due to its coefficient of expansion at the maximum temperature, no loss of press fit between the rings will occur and each ring will perform its intended function and the structural integrity of the pressure vessel will be maintained. Since tungsten carbide has a coefficient of expansion C.E.$_{TC}$ less than the coefficient of expansion of steel C.E.$_S$, it has been discovered that the coefficient of expansion of the intermediate ring 23 must have a coefficient of expansion greater than that of steel; in the preferred embodiment of the present invention, the material of the intermediate ring 23 was chosen to be beryllium copper having a coefficient of expansion C.E.$_{BC}$ whereby:

$$C.E._{BC} > C.E._S \quad (2)$$

The temperature compensated pressure vessel 20 of FIG. 2 embodies the present invention and is constructed in accordance with the teachings of the present invention as follows. The pressure vessel 20 includes a steel liner or ring 21, a tungsten carbide ring 22, an interrupted intermediate ring 23 of beryllium copper constructed particularly in accordance with the teachings of the present invention, and an outer steel support ring 25.

Figure 2:
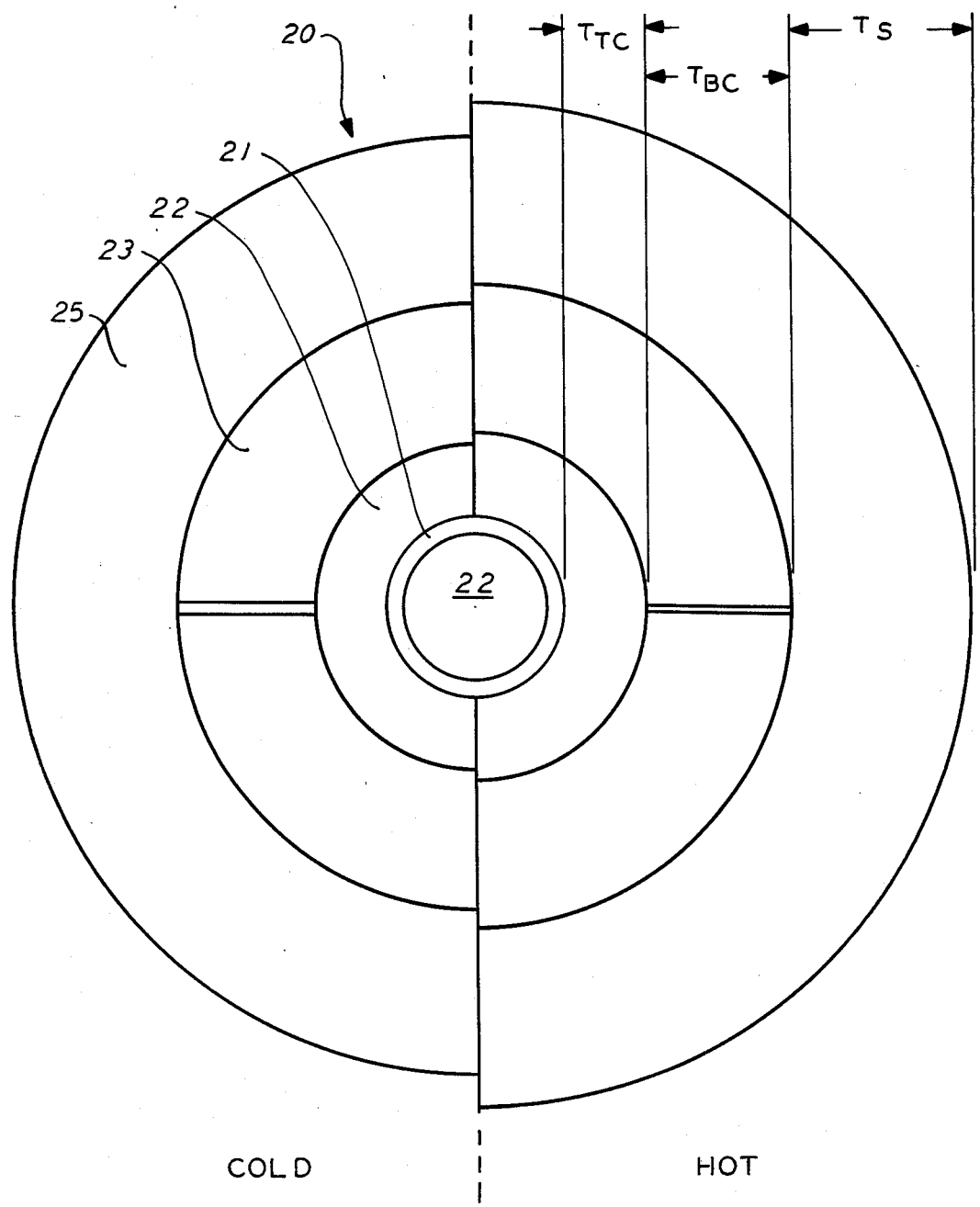
FIG. 2 is a diagrammatical, cross-sectional split view illustration of a temperature compensated pressure vessel embodying the present invention, the left portion of the FIG. shows the relative positions of the pressure vessel structural members when cold and the right portion when hot.

As is known to those skilled in the art, in pressure vessels of the type shown in FIGS. 1 and 2, upon the bore diameter of the pressure vessel being known, and the load or pressure level to be contained by the pressure level being known, and the compressive stress or support to be provided by the tungsten carbide ring 22 being known, the radial thickness $T_{TC}$ of the tungsten carbide ring 22 can be determined and the coefficient of expansion of the tungsten carbide ring 22 at the maximum operating temperature of the pressure vessel 20 is known. Also, the coefficient of expansion of the steel outer support ring 25 at the maximum operating temperature of the pressure vessel 20 will be known; it will be understood by those skilled in the art that the actual radial thickness $T_S$ of the outer steel ring 25 will be determined by other pressure vessel design factors not relevant to the present invention and the only relevant significant factor of the steel outer ring 25 with regard to the present invention is its coefficient of expansion at the maximum operating temperature of the pressure vessel 20. Accordingly, it will be understood by those skilled in the art that the only unknown is the radial thickness $T_{BC}$ of the intermediate beryllium copper ring 23 which must be determined such that upon the pressure vessel operating at its maximum operating temperature, the combined expansions or increases in radial thicknesses of the tungsten carbide ring 21 and the interrupted intermediate beryllium copper ring 23 will equal, or substantially equal, the expansion or increase in radial thickness of the outer steel support ring 25. Hence, it has been discovered that to retain the respective press fits between the rings and pressure vessel at all temperatures up to the maximum operating temperature, the following relationship must exist:

$$T_{TC} + T_{BC} = T_S \quad (3)$$

note FIG. 2 where $T_{TC}$ equals the radial thickness of the tungsten carbide, $T_{BC}$ equals the radial thickness of the beryllium copper, and $T_S$ equals $T_{TC} + T_{BC}$. Since it is desired, as taught above, that upon the pressure vessel 20 operating to its maximum temperature, the combined expansions or increases in radial thicknesses of the tungsten carbide ring 21 and beryllium copper ring 23 due to their respective coefficients of expansion must equal the expansion or increase in radial thickness of the outer steel support ring 25 due to its coefficient of expansion to insure no loss of press fit between the rings; this relationship, substituting from equation (3), may be expressed as follows:

$$C.E._{TC} \times T_{TC} + C.E._{BC} \times T_{BC} = C.E._S \times (T_{TC} + T_{BC}). \quad (4)$$

Solving for the radial thickness $T_{BC}$ of the interrupted beryllium copper ring 23, the radial thickness $T_{BC}$ of the beryllium copper ring is found to be:

$$T_{BC} = T_{TC} \times ((C.E._S - C.E._{TC})/(C.E._{BC} - C.E._S)) \quad (5)$$

In one embodiment of the temperature compensated pressure vessel of the present invention, operating to a maximum temperature of 800° F., the tungsten carbide ring 22 had a radial thickness $T_{TC}$ of 0.5 inch and the beryllium copper ring had a radial thickness of 0.68 inch and the press fit between the inner ring of tungsten carbide, the intermediate ring of beryllium copper and outer ring of steel was retained at all temperatures.

Figure 3:
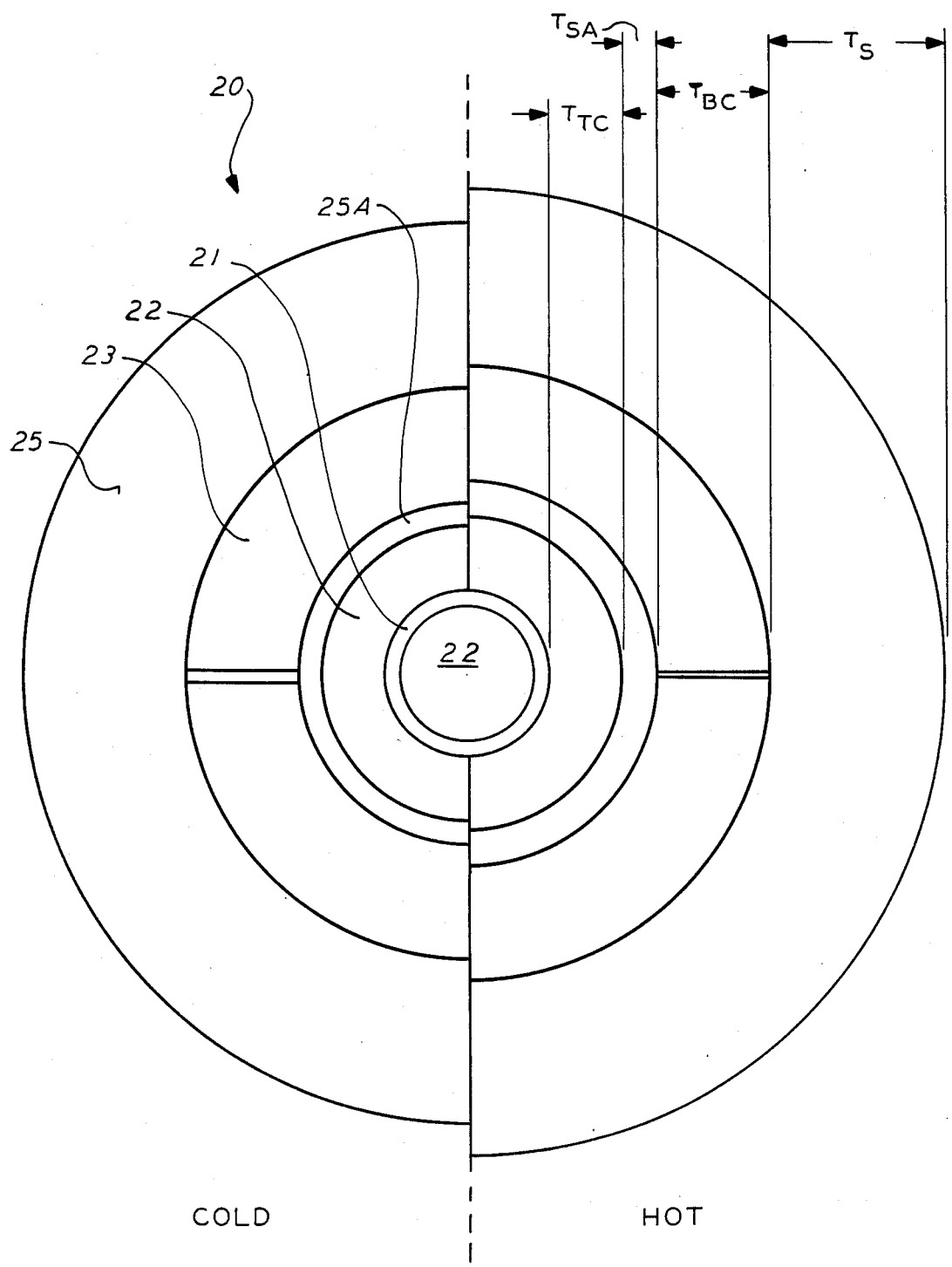
FIG. 3 is a diagrammatical, cross-sectional split view of an alternate embodiment of a temperature compensated pressure vessel embodying the present invention, the left portion of the FIG. shows the relative positions of the pressure vessel structural members when cold and the right portion when hot.

It will be recalled as noted above that insofar as the present invention is concerned only the coefficient of expansion C.E.$_S$ of the outer steel ring 25 is relevant and that the radial thickness $T_S$, O.D., and I.D. of the steel ring, may be determined by other design factors not relevant to the present invention. Accordingly, it will be understood that it is possible that upon the radial thickness of the intermediate ring, e.g. radial thickness $T_{BC}$ of intermediate beryllium copper ring 23 being determined, and upon the radial thickness $T_S$ of the outer steel ring and its I.D. and O.D. being determined by other design considerations, that a physical gap may exist between the O.D. of the intermediate beryllium copper ring and the I.D. of the outer steel ring. Accordingly, and in accordance with the further teachings of the present invention and referring to FIG. 3, it has been discovered that an additional intermediate ring, such as additional intermediate ring 25a, of the same material as the outer ring 25 may be provided and since the additional intermediate ring 25a has the same coefficient of expansion C.E.$_S$ of the outer steel ring 25, the above-noted physical gap is filled and the press fit between the rings of the pressure vessel 20 of FIG. 3 will also be maintained at all temperatures up to the maximum operating temperature of the pressure vessel. It will be further understood in accordance with the teachings of the present invention that the additional intermediate ring may be provided intermediate the inner ring 22 and the intermediate ring 23 or, alternatively, the additional intermediate ring of the same material as the outer ring may be provided intermediate the intermediate ring 23 and the outer ring 25.

It will be further understood by those skilled in the art that many modifications and variations may be made in the present invention without departing from the spirit and scope thereof.

What is claimed is:

1. In a pressure vessel comprised of a plurality of press-fitted concentric rings and designed to operate to a maximum temperature, such pressure vessel including an inner ring of a first predetermined material having a first coefficient of expansion at said temperature and an outer ring of a second predetermined material having a second coefficient of expansion at said temperature greater than said first coefficient of expansion, wherein the improvement comprises:
   an intermediate ring of a third predetermined material having a predetermined radial thickness and a third coefficient of expansion at said temperature greater than said second coefficient of expansion, the combined expansion of said inner ring and said intermediate ring at said temperature being substantially the same as the expansion of said outer ring at said temperature to maintain said press-fit at all operating temperatures to said maximum operating temperature.

2. In a pressure vessel comprised of a plurality of press-fitted concentric rings and designed to operate to a maximum temperature, such pressure vessel including an inner ring of a first predetermined material having a first coefficient of expansion at said temperature and an outer ring of a second predetermined material having a second coefficient of expansion at said temperature, said second coefficient of expansion greater than said first coefficient of expansion, wherein the improvement comprises:

an intermediate ring of a third predetermined material having a predetermined radial thickness and a third coefficient of expansion at said temperature greater than said second coefficient of expansion, the combined expansions of said inner ring and said intermediate ring at said temperature being substantially the same were said inner ring and said intermediate ring to have said second coefficient of expansion whereby said press-fit is retained at all operating temperatures up to said maximum operating temperature.

3. In a pressure vessel comprised of a plurality of press-fitted concentric rings and designed to operate to a maximum temperature, including an inner ring of first predetermined material having a first coefficient of expansion $C.E._1$ at said temperature and a first radial thickness $T_1$ and an outer ring of second predetermined material having a second coefficient of expansion $C.E._2$ at said temperature and having a second radial thickness $T_2$, said second coefficient of expansion $C.E._2$ greater than said first coefficient of expansion $C.E._1$, wherein the improvement comprises:

an intermediate ring of third predetermined material having a third coefficient of expansion $C.E._3$ at said temperature greater than said second coefficient of expansion $C.E._2$ and a third radial thickness $T_3$, wherein the third radial thickness is determined as follows:

$$T_3 = T_1 \times ((C.E._2 - C.E._1)/(C.E._3 - C.E._2))$$

wherein upon said pressure vessel operating at said maximum temperature the combined increases in radial thicknesses $T_1$ and $T_3$ substantially equal the increase in radial thickness of radial thickness $T_2$ to cause said press-fit of said rings to be retained at all operating temperatures through said maximum operating temperature.

4. In a pressure vessel according to claim 3 wherein said first predetermined material is tungsten carbide having a coefficient of expansion $C.E._{TC}$ at said temperature in a radial thickness $T_{TC}$, wherein said second predetermined material is steel having a coefficient of expansion $C.E._S$ at said temperature and a radial thickness $T_S$, and wherein said third predetermined material is beryllium copper having a coefficient of expansion $C.E._{BC}$ at said temperature and a radial thickness $T_{BC}$, and wherein the radial thickness of said beryllium copper is:

$$T_{BC} = T_{TC} \times ((C.E._S - C.E._{TC})/(C.E._{BC} - C.E._S)).$$

* * * * *